United States Patent
Kobayashi (10) Patent No.: US 9,608,258 B2
(45) Date of Patent: Mar. 28, 2017

(54) BATTERY MANUFACTURING METHOD (75) Inventor: Kiwamu Kobayashi, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 236 days.

(21) Appl. No.: 13/877,688

(22) PCT Filed: Oct. 5, 2010

(86) PCT No.: PCT/JP2010/067477
§ 371 (c)(1),
(2), (4) Date: Apr. 4, 2013

(87) PCT Pub. No.: WO2012/046305
PCT Pub. Date: Apr. 12, 2012

(65) Prior Publication Data
US 2013/0202781 A1  Aug. 8, 2013

(51) Int. Cl.
*H01M 4/04* (2006.01)
*H01M 4/1393* (2010.01)
(Continued)

(52) U.S. Cl.
CPC ........... *H01M 4/0404* (2013.01); *H01M 4/04* (2013.01); *H01M 4/0409* (2013.01);
(Continued)

(58) Field of Classification Search
CPC ...... H01M 10/40; H01M 4/0404; H01M 4/04; H01M 4/0409; H01M 4/0411; H01M 4/1393; H01M 4/62; H01M 4/661; H01M 10/0525; Y02P 70/54; Y02E 60/122; Y02T 10/7011
(Continued)

(56) References Cited

U.S. PATENT DOCUMENTS 5,259,950 A * 11/1993 Shiro et al. .................. 210/490
2005/0271940 A1  12/2005 Fukunaga et al.

FOREIGN PATENT DOCUMENTS

CN    1684289      10/2005
JP    2000-323125  11/2000
(Continued)

OTHER PUBLICATIONS

Machine translation of JP200609270A.*

*Primary Examiner* — Katherine A Bareford
*Assistant Examiner* — Christina McClure
(74) *Attorney, Agent, or Firm* — Finnegan, Henderson, Farabow, Garrett & Dunner, LLP (57) ABSTRACT

The present invention provides a battery manufacturing method including: a step of preparing a thickener aqueous solution by dissolving a thickener in an aqueous solvent (S10); a kneading step of introducing an active material into the prepared thickener aqueous solution and kneading a result (S20); a diluting step of adding an aqueous solvent to a kneaded material resulting from the kneading step such that the kneaded material is diluted, whereby an active material layer forming paste is obtained from the kneaded material (S30); and a step of obtaining an electrode in which an active material layer is formed on a current collector by coating the current collector with the active material layer forming paste and then drying the paste (S40).

9 Claims, 8 Drawing Sheets (51) Int. Cl.
 *H01M 4/62* (2006.01)
 *H01M 10/0525* (2010.01)
 *H01M 4/66* (2006.01)

(52) U.S. Cl.
 CPC ....... *H01M 4/0411* (2013.01); *H01M 4/1393* (2013.01); *H01M 4/62* (2013.01); *H01M 4/661* (2013.01); *H01M 10/0525* (2013.01); *Y02E 60/122* (2013.01); *Y02P 70/54* (2015.11); *Y02T 10/7011* (2013.01)

(58) Field of Classification Search
 USPC .......................................................... 427/58
 See application file for complete search history.

(56) References Cited

FOREIGN PATENT DOCUMENTS

| | | |
|---|---|---|
| JP | 2001-56524 | 2/2001 |
| JP | 2006-92760 | 4/2006 |
| JP | 2006-107896 | 4/2006 |
| JP | 2006092760 A * | 4/2006 |
| JP | 2010-80297 | 4/2010 |
| JP | 2010-165493 | 7/2010 |
| JP | 2010-211975 | 9/2010 |

\* cited by examiner

BATTERY MANUFACTURING METHOD

CROSS-REFERENCE TO RELATED APPLICATIONS

This application is a national phase application of International Application No. PCT/JP2010/067477, filed Oct. 5, 2010, the content of which is incorporated herein by reference.

TECHNICAL FIELD

The present invention relates to a method for manufacturing a battery, and more particularly to a method for manufacturing a battery that includes an electrode having an active material layer formed by coating a current collector with an active material layer forming paste containing an active material, a thickener, and water, and then drying the paste.

BACKGROUND ART

In recent years, lithium secondary batteries, nickel hydrogen batteries, and other secondary batteries have increased in importance as vehicle-installed power supplies or power supplies for personal computers and portable terminals. A lithium secondary battery in particular is lightweight and exhibits a high energy density, and may therefore be used favorably as a high output power supply for installation in a vehicle.

A typical configuration of a lithium secondary battery includes an electrode in which a material (an electrode active material) capable of occluding and discharging lithium ions reversibly is formed on a conductive member (an electrode current collector). For example, a carbon-based material such as graphite may be cited as a negative electrode active material used in a negative electrode. Further, an elongated sheet member having copper or a copper alloy as a main body may be cited as the electrode current collector (also referred to hereafter as a "negative electrode current collector") used in the negative electrode. This type of negative electrode for a battery is manufactured by, for example, dispersing the negative electrode active material and a thickener through an appropriate solvent (water, for example) and kneading a result to prepare a negative electrode active material layer forming paste, coating the negative electrode current collector with the prepared paste, and then drying the paste. Patent Literature 1 to 3 may be cited as prior art relating to the manufacture of this type of electrode.

CITATION LIST

Patent Literature

Patent Literature 1: Japanese Patent Application Publication No. 2006-092760
Patent Literature 2: Japanese Patent Application Publication No. 2000-323125
Patent Literature 3: Japanese Patent Application Publication No. 2001-056524

SUMMARY OF INVENTION

Patent Literature 1 discloses forming a negative electrode coating film forming paste by adding an aqueous solution of a thickener to graphite (a negative electrode active material), kneading (stiff-kneading) the result, diluting the kneaded material in the thickener aqueous solution, and kneading the result. With the technique disclosed in Patent Literature 1, however, although the thickener and the graphite are dispersed evenly through the resulting negative electrode coating film forming paste, new thickener is introduced following the stiff-kneading, leading to variation in a viscosity of the paste, and it is therefore difficult to control the paste viscosity. The viscosity of the paste increases particularly strikingly When a solid content of the paste is increased in order to dry the active material layer forming paste more quickly. As a result, an ability to coat the current collector with the paste is impaired, causing stripes and thickness unevenness on a coating surface.

The present invention has been designed in consideration of this point, and a main object thereof is to provide a battery manufacturing method with which coating defects in an active material layer forming paste can be avoided such that an electrode exhibiting superior quality stability can be manufactured.

The present inventor found, through committed study for the purpose of solving the problem described above, that an active material layer forming paste in which a thickener and an active material are dispersed extremely favorably (in other words, the thickener and the active material are dispersed evenly) can be manufactured without increasing a viscosity of the paste by kneading together a thickener aqueous solution and the active material and then diluting the result in an aqueous solvent, and thus arrived at the present invention.

More specifically, the present invention provides a method for manufacturing a battery that includes an electrode having an active material layer which is formed by coating a current collector with an active material layer forming paste containing an active material, a thickener, and an aqueous solvent, and then drying the paste. The manufacturing method includes: a step of preparing a thickener aqueous solution by dissolving the thickener in the aqueous solvent; a kneading step of introducing the active material into the prepared thickener aqueous solution and kneading a result; a diluting step of adding the aqueous solvent to a kneaded material resulting from the kneading step such that the kneaded material is diluted, whereby the active material layer forming paste is obtained from the kneaded material; and a step of obtaining the electrode in which the active material layer is formed on the current collector by coating the current collector with the active material layer forming paste and then drying the paste.

With the battery manufacturing method according to the present invention, the thickener aqueous solution and the active material are kneaded, whereupon a resulting stiff-kneaded material is diluted in the aqueous solvent. Therefore, an active material layer forming paste in which the thickener and the active material are dispersed extremely favorably (in other words, the thickener and the active material are dispersed evenly) can be manufactured without increasing a paste viscosity. When this active material layer forming paste is used, the active material is adsorbed forcefully to the thickener, and therefore adhesive strength in the active material and between the active material and the current collector can be improved. Further, the ability to coat the paste onto the current collector is favorable, and therefore stripes and thickness unevenness can be eliminated from the coating surface. Hence, according to the present invention, coating defects can be avoided in the active material layer forming paste, and an optimum battery exhibiting superior quality stability can be manufactured.

The paste viscosity of the active material layer forming paste obtained in the present invention does not increase even when the solid content is high, and therefore a paste exhibiting a favorable coating ability can be obtained. For example, the viscosity when measured using a commercially available E type viscometer at a liquid temperature regulated to 25° C. and a rotor rotation speed of 1 rpm is approximately no more than 10000 mPa·s, (between 1000 and 10000 mPa·s, for example), preferably no more than 8000 mPa·s, more preferably no more than 5000 mPa·s, and particularly preferably no more than 3000 mPa·s. Further, the solid content of the paste can be selected appropriately in accordance with aims, but is typically set at no less than 50% in order to facilitate drying. For example, a solid content range of 50 to 70% by mass is appropriate, while a range of 50 to 65% by mass is preferable, a range of 52 to 65% by mass is more preferable, and a range of 52 to 60% by mass is particularly preferable.

Preferred examples of the active material layer forming paste disclosed herein include a paste having a viscosity of no more than 10000 mPa·s and a solid content within a range of 50 to 70% by mass, a paste having a viscosity of no more than 8000 mPa·s and a solid content within a range of 50 to 65% by mass, a paste having a viscosity of no more than 5000 mPa·s and a solid content within a range of 52 to 65% by mass, a paste having a viscosity of no more than 3000 mP·s and a solid content within a range of 52 to 60% by mass, and so on. By setting the viscosity and the solid content within these predetermined ranges, a favorable active material layer forming paste that exhibits both a superior coating ability and a high drying efficiency, which is unobtainable conventionally, can be obtained.

An active material layer forming paste having a viscosity and a solid content within the above predetermined ranges can be realized by appropriately selecting a ratio between an amount of aqueous solvent introduced into the thickener aqueous solution and an amount of aqueous solvent introduced in the diluting step, for example. In other words, in the technique disclosed herein, the aqueous solvent of the active material layer forming paste is introduced in two stages, i.e. into the thickener aqueous solution and during the diluting step. In this case, by varying the ratio between the amount of aqueous solvent introduced into the thickener aqueous solution and the amount of aqueous solvent introduced in the diluting step, pastes having different viscosities but identical final solid contents can be manufactured.

The amount of aqueous solvent introduced into the thickener aqueous solution preferably occupies between 67% by mass and 76% by mass of a total amount of aqueous solvent in the active material layer forming paste. When the amount of aqueous solvent introduced into the thickener aqueous solution exceeds this range, the viscosity of the paste may increase, thereby impairing the ability to coat the current collector with the paste. When the amount of aqueous solvent introduced into the thickener aqueous solution falls below this range, on the other hand, the viscosity of the thickener aqueous solution may increase such that the thickener aqueous solution cannot easily be passed through a filter. In consideration of both the coating ability of the paste and the filtering ability of the thickener aqueous solution, the amount of aqueous solvent introduced into the thickener aqueous solution is set appropriately between approximately 67 and 76% by mass, preferably between 67.5 and 75.5% by mass, more preferably between 68 and 74% by mass, and particularly preferably between 70 and 73% by mass.

In a preferred aspect of the battery manufacturing method disclosed herein, the thickener aqueous solution is passed through a filter before performing the kneading step. By passing the thickener aqueous solution through a filter, insoluble components and intermixed foreign matter that may cause coating defects can be removed from the thickener.

A viscosity of approximately 1000 mPa·s to 10000 mP·s is appropriate as the viscosity of the thickener aqueous solution. When the viscosity of the thickener aqueous solution is too great, it may be impossible to pass the thickener aqueous solution through the filter, and therefore impossible to remove insoluble components and intermixed foreign matter. In an example of a favorable viscosity range of the thickener aqueous solution in terms of ease of passage through the filter, the viscosity when measured using a commercially available E type viscometer at a liquid temperature regulated to 25° C. and a rotor rotation speed of 1 rpm, for example, is no more than approximately 10000 mPa·s, preferably no more than 8000 mPa·s, more preferably no more than 6000 mPa·s, and particularly preferably no more than 4000 mPa·s.

In addition to the active material, the thickener, and the aqueous solvent, the active material layer forming paste may, if necessary, contain one, two or more materials (other active material layer forming components) used in an active material layer forming paste in a typical electrode structure. Representative examples of such materials include a binder and a conductive material. The binder and the conductive material are preferably introduced into the active material layer forming paste after the diluting step. In this case, the paste viscosity can be controlled more easily.

In a preferred aspect of the battery manufacturing method disclosed herein, a cellulose-based polymer is used as the thickener. Even a small amount of a cellulose-based polymer leads to an increase in a thickening action, and therefore a cellulose-based polymer is used favorably as the thickener in an active material layer forming paste applied to a battery in which the thickener may form a resistance component. Further, a cellulose-based polymer exhibits poor solubility, and when introduced in the form of a powder, insoluble components may remain in the paste. Hence, the effect according to the present invention of removing insoluble components by passing the thickener aqueous solution thorough to filter can be exhibited particularly favorably.

In a preferred aspect of the battery manufacturing method disclosed herein, the electrode is a negative electrode of a lithium secondary battery, and a carbon-based material is used as the active material. Further, foil-form copper or copper alloy is preferably used as the current collector.

The present invention further provides a battery (a lithium secondary battery, for example) including an electrode manufactured using any of the manufacturing methods disclosed herein, The battery is constructed using an electrode having an active material layer that exhibits superior quality stability and adhesiveness, as described above, and therefore a battery that exhibits superior battery characteristics (i.e. satisfies at least one (preferably all) of superior quality stability, high cycle durability, favorable productivity, a low manufacturing cost, and a favorable high rate charging/discharging performance, for example) can be provided.

This battery is suitable for use as a battery installed in a vehicle such as an automobile, for example. Accordingly, the present invention provides a vehicle including any one of the batteries (which may be provided in the form of a battery pack in which a plurality of batteries are connected) disclosed herein. The present invention may be applied particularly favorably to a vehicle (an automobile, for example) including the battery in the form of a lithium secondary battery (typically a lithium ion battery), which is lightweight and has a large capacity, wherein the lithium secondary battery serves as a power supply (typically a power supply for a hybrid vehicle or an electric vehicle).

DESCRIPTION OF EMBODIMENTS

An embodiment of the present invention will be described below with reference to the drawings. In the drawings to be described below, members and sites that exhibit identical actions have been allocated identical reference symbols. Note that dimensional relationships (lengths, widths, thicknesses, and so on) in the drawings do not reflect actual dimensional relationships. Further, matter (for example, a method for manufacturing an electrode active material, configurations and manufacturing methods of a separator and an electrolyte, general techniques relating to construction of a lithium secondary battery or another battery, and so on) required to implement the present invention other than items noted particularly in the specification may be understood as design items to be implemented by a person skilled in the art on the basis of conventional techniques in the corresponding field.

The present invention will be described in detail below with reference to a flowchart shown in FIG. 1, mainly taking as an example, while not being particularly limited to, a negative electrode (a negative electrode sheet) for a lithium secondary battery (typically a lithium ion battery) having a copper foil negative electrode current collector (copper foil).

In a method for manufacturing an electrode for a lithium secondary battery according to this embodiment, a negative electrode (a negative electrode sheet) having an active material layer is manufactured by coating a current collector with an active material layer forming paste containing an active material, a thickener, and an aqueous solvent, and then drying the paste.

Figure 1:
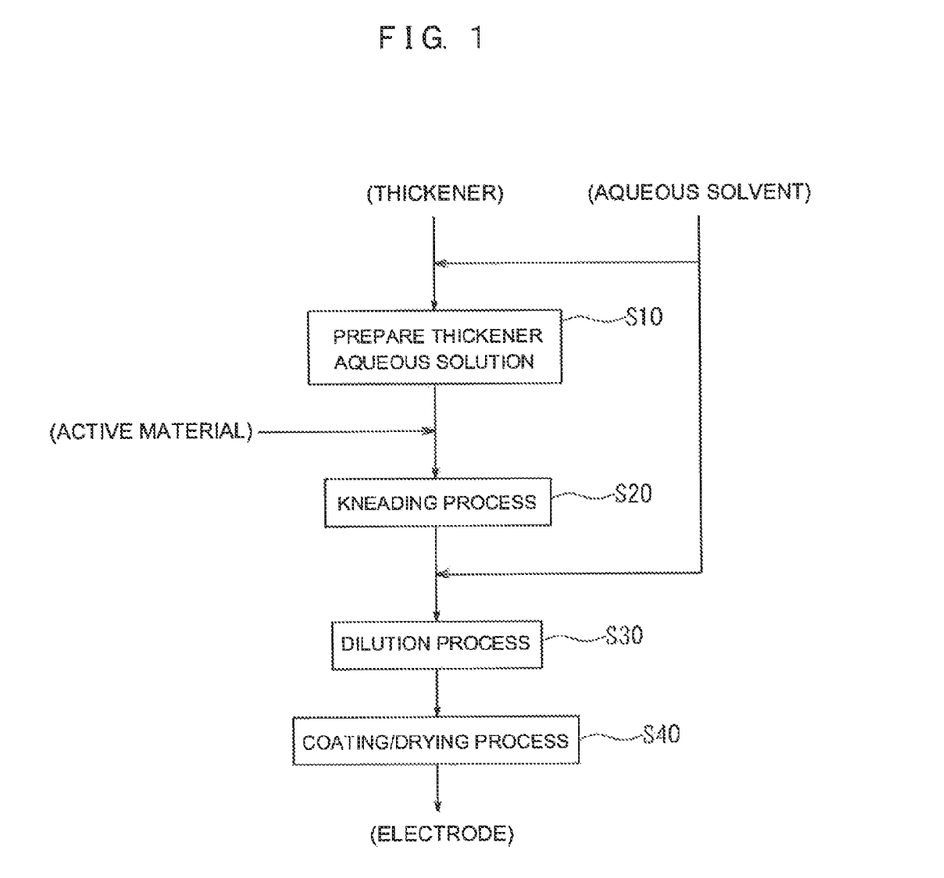
FIG. 1 is a view showing a manufacturing flow for an electrode according to an embodiment of the present invention.

As show in FIG. 1, in the negative electrode manufacturing method for a lithium secondary battery disclosed herein, a thickener aqueous solution is prepared by dissolving a thickener in an aqueous solvent (Step S10), and an active material is introduced into the prepared the thickener aqueous solution, whereupon the result is kneaded (Step S20). A resulting kneaded material is then diluted in an aqueous solvent to manufacture an active material layer forming paste from the kneaded substance (Step S30), whereupon a negative electrode (a negative electrode sheet) in which an active material layer is formed on a current collector is obtained by coating the current collector with the active material layer forming paste and drying the paste (Step S40).

In the process of Step S10, the thickener aqueous solution is prepared by dissolving the thickener in the aqueous solvent.

For various reasons, such as reducing an environmental load, reducing material costs, simplifying facilities, reducing waste, and improving ease of handling, an aqueous solvent is preferably used as the solvent employed in the thickener aqueous solution. Water or a mixed solvent having water as a main body is preferably used as the aqueous solvent. One, two or more types of an organic solvent (lower alcohol, lower ketone, or the like) that can be mixed evenly with water may be selected appropriately and used as the solvent component other than water forming the mixed solvent. For example, an aqueous solvent of which at least 80% by mass (preferably at least 90% by mass and more preferably at least 95% by mass) is water can be used favorably. An aqueous solvent substantially constituted by water may be cited as a particularly favorable example.

Various polymers that function as thickeners in an active material layer forming paste can be used favorably as the thickener. Preferred examples include cellulose-based polymers such as carboxymethyl cellulose (CMC), methyl cellulose (MC), hydroxypropyl methyl cellulose (HPMC), ethyl cellulose (EC), and hydroxyethyl methyl cellulose (HEMC). Alternatively, polyvinyl alcohol (PVA), ethylene-vinyl alcohol copolymer (EVOH), polyacrylate, oxidized starch, phosphorylated starch, casein, or the like may be used. The above materials may be used singly or in appropriate combinations.

An operation (process) for dissolving the thickener in the aqueous solvent may be performed using a powder absorbing and dissolving device, for example. A powder absorbing and dissolving device absorbs and mixes the thickener (powder) under negative pressure, and therefore even a highly viscous thickener (powder) can be dissolved evenly. In this embodiment, the thickener aqueous solution and the active material are stiff-kneaded, whereupon the kneaded material is diluted in the aqueous solvent, and therefore the amount of aqueous solvent introduced into the thickener aqueous solution is small, leading to an increase in a concentration (and therefore the viscosity) of the thickener aqueous solution. This type of highly viscous thickener exhibits poor solubility, and when introduced in the form of a powder, coarse insoluble components may form, causing coating defects (pin holes and the like) in the active material layer. By employing a powder absorbing and dissolving device, however, the highly concentrated thickener (powder) can be dissolved evenly, and therefore coarse insoluble components can be prevented from forming.

Note that in order to remove insoluble matter and intermixed foreign matter that may cause coating defects, the thickener aqueous solution may be passed through a filter. By passing the thickener aqueous solution through a filler, insoluble components and intermixed foreign matter of a size that may cause coating defects (for example, a diameter of at least 500 µm, preferably at least 300 µm, and more preferably at least 100 µm) can be removed reliably. The filter may be configured to be capable of collecting insoluble components and intermixed foreign matter having a diameter of, for example, at least 500 µm (preferably at least 300 µm, and more preferably at least 100 µm). In a preferred technique disclosed herein, filtering processing is performed using a folding filter in which a filter material is folded into a zigzag shape. A folding filter has a greater filter area (surface area) than a flat filter, and therefore the filtering processing can be performed easily even on a highly viscous thickener aqueous solution.

A viscosity of approximately 1000 mPa·s to 10000 mPa·s is appropriate as the viscosity of the thickener aqueous solution. When the viscosity of the thickener aqueous solution is too great, it may be impossible to pass the thickener aqueous solution through the filter, and therefore impossible to remove insoluble components and intermixed foreign matter. In an example of a favorable viscosity range of the thickener aqueous solution in terms of ease of passage through the filter, the viscosity when measured using a commercially available E type viscometer at a liquid temperature regulated to 20° C. and a rotor rotation speed of 20 rpm, for example, is no more than approximately 10000 mPa·s, preferably no more than 8000 mP·s, more preferably no more than 6000 mPa·s, and particularly preferably no more than 4000 mPa·s.

After preparing the thickener aqueous solution in this manner, the negative electrode active material is introduced into the prepared thickener aqueous solution, and the result is kneaded (stiff-kneaded) (Step S20 in FIG. 1: kneading process).

One, two or more types of materials used conventionally in lithium secondary batteries may be employed without any particular limitations as the negative electrode active material used in this embodiment. Preferred examples include carbon-based materials such as graphite carbon and amorphous carbon, a lithium transition metal compound oxide (a lithium titanium compound oxide or the like), a lithium transition metal compound nitride, and so on. A material powder prepared by a conventional method, for example, may be used as is as this material (which typically takes a particulate form). For example, a material powder formed substantially from particles having an average particle diameter within a range of approximately 1 μm to 25 μm based on a laser diffraction scattering method can be used favorably as the negative electrode active material.

An operation for stiff kneading (kneading) the negative electrode active material and the thickener aqueous solution may be performed similarly to a conventional operation undertaken during manufacture of an active material layer forming paste for a typical lithium secondary battery. For example, kneading (stiff-kneading) may be performed using an appropriate stirrer/kneader (a planetary mixer, a Homo Disper, a Clear Mix, a Fill Mix, or the like) until the active material and the thickener are dispersed evenly. A favorable kneading time for the kneading processing may be set at a time required to disperse the active material and the thickener evenly. The kneading (stiff-kneading) time may differ according to a device configuration and kneading conditions, but is normally between 10 minutes and 3 hours, and preferably between 10 minutes and 30 minutes. in the stiff-kneading process, since the viscosity is comparatively high, the active material and the thickener are kneaded with great force (shearing force, for example). As a result, dispersal of the thickener advances (the active material and the thickener are dispersed to an even condition) such that the active material is adsorbed forcefully to the thickener.

After stiff-kneading (kneading) the negative electrode active material and the thickener aqueous solution in this manner, the aqueous solvent is added to the resulting kneaded material to dilute the kneaded material, whereby the active material layer forming paste is obtained from the kneaded material (Step S30 in FIG. 1: dilution process).

An operation for diluting the kneaded material in the aqueous solvent may be performed by, for example, stirring the kneaded material and the aqueous solvent using an appropriate stirrer/kneader (a planetary mixer, a Homo Disper, a Clear Mix, a Fill Mix, or the like) until the active material and the thickener are evenly mixed. A favorable stirring time for the stirring processing may be set at a time required to mix together the kneaded material and the aqueous solvent evenly.

In a conventional method where the active material layer forming paste is manufactured by introducing the thickener aqueous solution after stiff-kneading, although an active material layer forming paste in which the thickener and the active material are dispersed evenly is obtained, new thickener is introduced after the stiff-kneading, leading to variation in the viscosity of the paste, and as a result, the viscosity of the paste cannot be controlled easily. The viscosity of the paste increases particularly strikingly when a solid content of the paste is increased in order to dry the active material layer forming paste more quickly. As a result, the ability to coat the current collector with the paste is impaired, causing stripes and thickness unevenness on the coating surface.

In this embodiment, on the other hand, the active material layer forming paste is manufactured by stiff kneading the thickener aqueous solution and the active material and then diluting the resulting kneaded material in the aqueous solvent. Therefore, an active material layer forming paste in which the thickener and the active material are dispersed extremely favorably (in other words, the thickener and the active material are dispersed evenly) can be manufactured without an increase in the paste viscosity. The paste viscosity of the resulting active material layer forming paste does not increase even When the solid content is high, and therefore a paste exhibiting a favorable coating ability can be obtained. For example, the viscosity when measured using a commercially available E type viscometer at a liquid temperature regulated to 25° C. and a rotor rotation speed of 1 rpm, for example, is approximately no more than 10000 mPa·s, (between 1000 and 10000 mPa·s, for example), preferably no more than 8000 mPa·s, more preferably no more than 5000 mPa·s, and particularly preferably no more than 3000 mPa·s. Further, the solid content of the paste can be selected appropriately in accordance with aims, but is preferably as high as possible to facilitate drying. To facilitate drying, the solid content is preferably set at no less than 40%. For example, a solid content of no less than 45% is appropriate, while a solid content of no less than 50% is preferable and a solid content of no less than 52% (a range of at least 52 to 90%, for example) is more preferable. With a conventional technique, the viscosity rises as the solid content is increased, and therefore the solid content must be suppressed to a maximum of approximately 40%. According to this technique, however, the paste viscosity does not increase even when the solid content is high, and therefore a high solid content of 50% or more can be realized easily.

Preferred examples of the active material layer forming paste disclosed herein include a paste having a viscosity of no more than 10000 mPa·s and a solid content of no less than 50% (within a range of 50 to 70%, for example), a paste having a viscosity of no more than 8000 mPa·s and a solid content of no less than 50% (within a range of 50 to 65%, for example), a paste having a viscosity of no more than 5000 mPa·s and a solid content of no less than 52% (within a range of 52 to 65%, for example), a paste having a viscosity of no more than 3000 mPa·s and a solid content of no less than 52% (within a range of 52 to 60%, for example), and so on. By setting the viscosity and the solid content within these predetermined ranges, a favorable active material layer forming paste that exhibits both a superior coating ability and a high drying efficiency, which is unobtainable conventionally, can be obtained.

As shown in FIG. 1, an active material layer forming paste having a viscosity and a solid content within the above predetermined ranges can be realized by appropriately selecting a ratio between an amount A of the aqueous solvent introduced into the thickener aqueous solution and an amount B of the aqueous solvent introduced in the dilution process, for example. In other words, in the technique disclosed herein, the aqueous solvent of the active material layer forming paste is introduced in two stages, i.e. into the thickener aqueous solution and during the dilution process. In this case, by varying the ratio between the amount A of the aqueous solvent introduced into the thickener aqueous solution and the amount B of the aqueous solvent introduced in the dilution process, pastes having different viscosities but identical final solid contents can be manufactured.

The amount of aqueous solvent introduced into the thickener aqueous solution preferably occupies between 67% by mass and 76% by mass of a total amount of aqueous solvent in the active material layer forming paste. When the amount of aqueous solvent introduced into the thickener aqueous solution exceeds this range, the viscosity of the paste may increase, thereby impairing the ability to coat the current collector with the paste. When the amount of aqueous solvent introduced into the thickener aqueous solution falls below this range, on the other hand, the viscosity of the thickener aqueous solution may increase such that the thickener aqueous solution cannot be passed easily through the filter. In consideration of both the coating ability and the filtering ability, the amount of aqueous solvent introduced into the thickener aqueous solution is set appropriately between approximately 67 and 76% by mass, preferably between 67.5 and 75.5% by mass, more preferably between 68 and 74% by mass, and particularly preferably between 70 and 73% by mass.

Note that in addition to the active material, the thickener, and the aqueous solvent, the active material layer forming paste may, if necessary, contain one, two or more materials (other active material layer forming components) used in an active material layer forming paste in a typical electrode structure. Representative examples of such materials include a binder and a conductive material. A polymer such as styrene butadiene rubber (SBR), carboxymethyl cellulose (CMC), polytetrafluoroethylene (PTFE), polyethylene (PE), or polyacrylic acid (PAA) may be used as the binder. A conductive metal powder such as carbon powder, for example carbon black (acetylene black or the like) or nickel powder may be used as the conductive material. These materials are preferably introduced into the active material layer forming paste after the dilution process.

After forming the active material layer forming paste as described above, a negative electrode current collector is coated with the active material layer forming paste, whereupon the paste is dried. As a result, a negative electrode in which a negative electrode active material layer is formed on a negative electrode current collector is obtained (Step S40 in FIG. 1).

An operation for coating the negative electrode current collector with the active material layer forming paste may be performed similarly to a conventional operation undertaken during manufacture of a typical lithium secondary battery. For example, the negative electrode can be manufactured by coating the negative electrode current collector with a predetermined amount of the active material layer forming paste at an even thickness using an appropriate coating device (a die coater, a slit coater, a comma coater, or the like). Following coating, the coated material is dried using appropriate drying means (typically at 70° C. to 200° C.).

Figure 2:
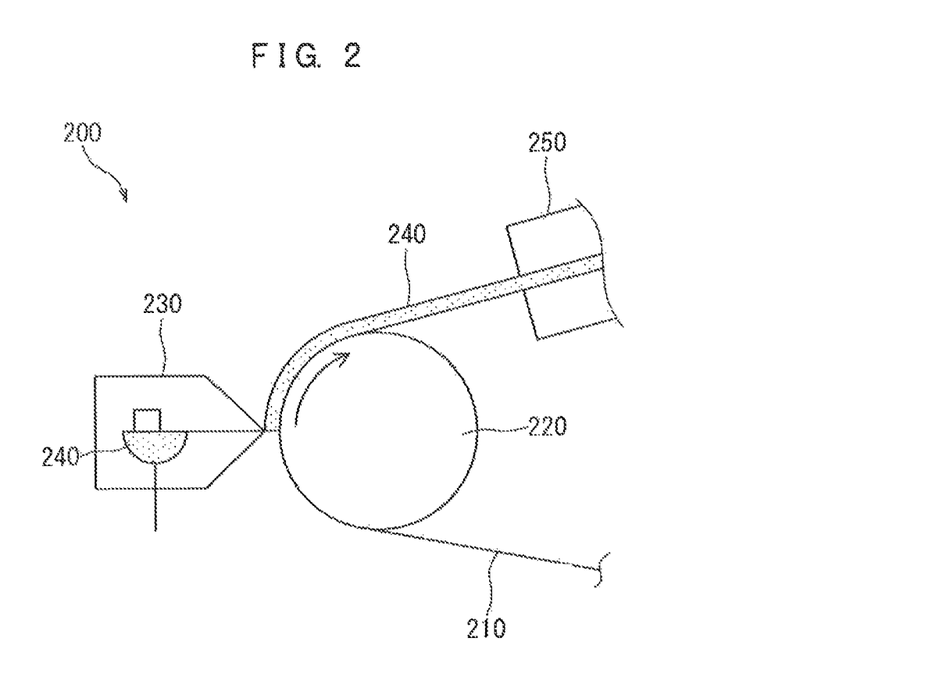
FIG. 2 is a pattern diagram showing a coating device according to this embodiment of the present invention.

A coating device 200 shown in FIG. 2, for example, may be used as a device for coating the negative electrode current collector with the active material layer forming paste. In the coating device 200, an elongated sheet-shaped negative electrode current collector 210 is conveyed by the rotation of a backup roll 220 so as to pass through a gap between the backup roll 220 and a die 230, whereby the negative electrode current collector 210 is coated with an active material layer forming paste 240. The solvent (water, for example) in the active material layer forming paste 240 is vaporized while passing through a drying oven 250, and as a result, an elongated sheet-shaped negative electrode is manufactured.

Here, to improve an operating efficiency of the coating device 200, the solid content of the active material layer forming paste 240 is preferably increased. When the solid content of the active material layer forming paste is increased, the paste dries more quickly, and therefore a drying time (a time required to pass through the drying oven 250) can be shortened, enabling an improvement in the operating efficiency of the coating device 200. However, when the solid content of the active material layer forming paste is increased, the paste viscosity rises, and as a result, the ability to coat the negative electrode current collector 210 with the paste may be greatly impaired. For example, the behavior of the paste 240 may become unstable such that the paste 240 does not separate smoothly from the die 230, and as a result, stripes and thickness unevenness may occur on the coating surface.

In the active material layer forming paste obtained according to this configuration, however, the paste viscosity does not increase even when the solid content is high (50% by mass or more, for example), and therefore the ability to coat the negative electrode current collector 210 with the paste from the die 230 remains favorable. Accordingly, the drying time of the paste can be shortened (a line speed can be increased) while suppressing an increase in coating defects. By shortening the drying time, the coating device 200 can be operated efficiently, and as a result, favorable electrode productivity is realized. Further, capital investment in facilities for the drying process can be reduced greatly, leading to a reduction in manufacturing cost.

Next, the solvent (here, water) in the active material layer forming paste is removed by vaporizing the solvent contained in the active material layer forming paste in the drying oven 250. By removing the solvent from the active material layer forming paste, a negative electrode active material layer containing a negative electrode active material is formed.

Thus, a negative electrode (negative electrode sheet) in which a negative electrode active material layer is formed on a negative electrode current collector can be obtained. Note that by implementing appropriate pressing processing (roll pressing processing, for example) as required following drying, the thickness and density of the negative electrode active material layer can be adjusted appropriately.

With the battery manufacturing method according to this embodiment, the thickener aqueous solution and the active material are kneaded (stiff-kneaded), whereupon the kneaded material is diluted in the aqueous solvent. Therefore, an active material layer forming paste in which the thickener and the active material are dispersed extremely favorably (in other words, the thickener and the active material are dispersed evenly) can be manufactured without an increase in the paste viscosity. When this active material layer forming paste is used, the active material is adsorbed forcefully to the thickener, and therefore adhesive strength in the active material and between the active material and the current collector can be improved. Further, the ability to coat the current collector with the paste is favorable, and therefore stripes and thickness unevenness can be eliminated from the coating surface. Hence, according to this configuration, coating defects can be avoided in the active material layer forming paste, and an optimum electrode (a negative electrode, for example) exhibiting superior quality stability can be manufactured.

As described above, the electrode (negative electrode, for example) according to this embodiment exhibits superior quality stability without coating defects, and can therefore be used favorably as a structural element of various types of batteries or a structural element (a negative electrode, for example) of an electrode body built into a battery. For example, a negative electrode manufactured using any of the methods disclosed herein may be used favorably as a structural element of a lithium secondary battery including: a positive electrode (which may be a positive electrode manufactured by applying the present invention); an electrolyte disposed between the positive and negative electrodes; and a separator (which may be omitted in a battery that uses a solid or gel-form electrolyte) that typically separates the positive and negative electrodes from each other. There are no particular limitations on a structure (a metallic casing or a laminate film structure, for example) or a size of an outer container forming the battery, a structure (a wound structure or a laminated structure, for example) of an electrode body having positive and negative current collectors as main structural elements, and so on.

Figure 3:
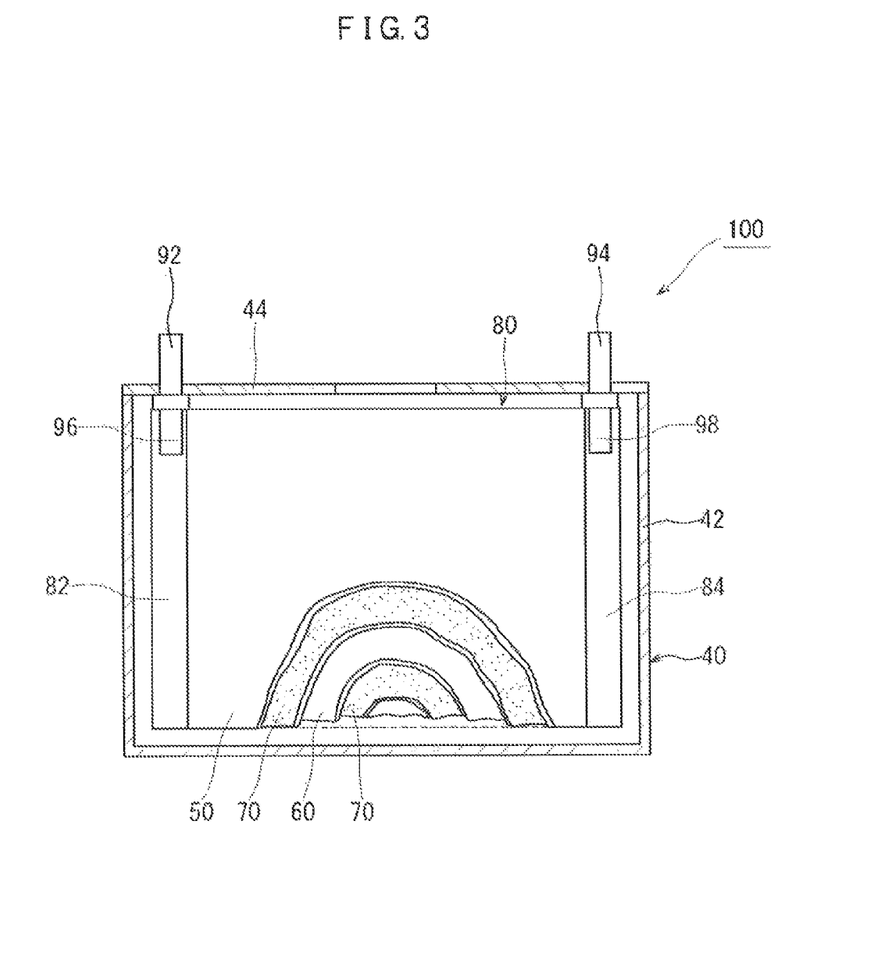
FIG. 3 is a pattern diagram showing a battery according to this embodiment of the present invention.

An embodiment of a lithium secondary battery constructed using the sheet-shaped negative electrode (negative electrode sheet) manufactured by applying the method of the present invention will be described below with reference to a pattern diagram shown in FIG. 3.

As shown in the drawing, a lithium secondary battery 100 according to this embodiment includes a metallic (resin or laminate film may also be used favorably) case 40. The case (outer container) 40 includes a flat rectangular parallelepiped-shaped case main body 42 having an open upper end, and a lid body 44 closing a resulting opening portion. A positive electrode terminal 92 that is electrically connected to a positive electrode of a wound electrode body 80 and a negative electrode terminal 94 that is electrically connected to a negative electrode of the electrode body 80 are provided on an upper surface of the case 40 (i.e. on the lid body 44). The flat wound electrode body 80, which is manufactured by, for example, laminating and winding an elongated sheet-shaped positive electrode (positive electrode sheet) 50 and an elongated sheet-shaped negative electrode (negative electrode sheet) 60 together with a total of two elongated sheet-shaped separators (separator sheets) 70 and then crushing a resulting wound body from a side face direction such that the wound body is flattened, is housed inside the case 40.

The positive electrode sheet 50 and the negative electrode sheet 60 are respectively configured such that an electrode active material layer having an electrode active material as a main component is provided on both surfaces of an elongated sheet-shaped electrode current collector. An electrode active material layer unformed part in which the electrode active material layer is not provided on either surface is formed at one width direction end of the electrode sheets 50, 60. During the lamination process described above, the positive electrode sheet 50 and the negative electrode sheet 60 are overlapped at a slight deviation in the width direction such that a positive electrode active material layer unformed part of the positive electrode sheet 50 and a negative electrode active material layer unformed part of the negative electrode sheet 60 protrude respectively from both width direction sides of the separator sheet 70. As a result, the electrode active material layer unformed parts of the positive electrode sheet 50 and the negative electrode sheet 60 protrude outwardly from respective wound core parts (i.e. parts in which a positive electrode active material layer formed part of the positive electrode sheet 50, a negative electrode active material layer formed part of the negative electrode sheet 60, and the two separator sheets 70 are wound tightly) in a lateral direction relative to a winding direction of the wound electrode body 80. A positive electrode lead terminal 96 and a negative electrode lead terminal 98 are annexed to a positive electrode side protruding part (i.e. the positive electrode active material layer unformed part) 82 and a negative electrode side protruding part (i.e. the negative electrode active material layer unformed part) 84, respectively, whereby the positive electrode protruding part 82 and the negative electrode protruding part 84 are electrically connected to the positive electrode terminal 92 and the negative electrode terminal 94, respectively.

Structural elements of the wound electrode body 80, apart from the process for manufacturing the negative electrode sheet, are not particularly limited and may be similar to those of an electrode body for a conventional lithium secondary battery. In the positive electrode sheet 50, for example, a positive electrode active material layer is formed on a surface of an elongated positive electrode current collector. Aluminum foil (in this embodiment) or another metal foil suitable for a positive electrode can be used favorably for the positive electrode current collector. One, two or more types of materials used conventionally in lithium secondary batteries may be employed without any particular limitations as the positive electrode active material. As a preferred example, a material having a lithium transition metal compound oxide containing lithium and one, two or more transition metal elements as structural metal elements, such as $LiMn_2O_4$, $LiCoO_2$, or $LiNiO_2$, as a main component may be used favorably.

In the negative electrode sheet 60, similarly to the positive electrode sheet 50, a negative electrode active material layer is formed on a surface of an elongated negative electrode current collector. Copper foil (in this embodiment) or another metal foil suitable for a negative electrode can be used favorably for the negative electrode current collector. One, two or more types of materials used conventionally in lithium secondary batteries may be employed without any particular limitations as the negative electrode active material. Preferred examples include carbon-based materials such as graphite carbon and amorphous carbon, a lithium transition metal compound oxide, a lithium transition metal compound nitride, and so on.

Further, a material formed from porous polyolefin resin may be cited as a preferred example of the separator sheets 70 used between the positive electrode sheet 50 and negative electrode sheet 60. A synthetic resin (a polyolefin such as polyethylene, for example) porous separator sheet, for example, can be used favorably. Note that when a solid electrolyte or a gel-form electrolyte is used as the electrolyte, a separator may not be required (in other words, in this case, the electrolyte itself can function as a separator).

The wound electrode body 80 thus configured is housed in the case main body 42, and an appropriate non-aqueous electrolyte is disposed in (injected into) the case main body 42. A similar electrolyte to a non-aqueous electrolyte used in a conventional lithium ion battery may be used without any particular limitations as the non-aqueous electrolyte housed in the case main body 42 together with the wound electrode body 80. In a typical composition of the non-aqueous electrolyte, a supporting electrolyte is contained in an appropriate non-aqueous solvent. A non-aqueous electrolyte in which $LiPF_6$ is contained at a concentration of approximately 1 mol/l as a supporting electrolyte in a mixed solvent containing ethylene carbonate (EC), ethylmethyl carbonate (EMC), and dimethyl carbonate (DMC) in a volume ratio of 3:4:3, for example, may be used.

Construction (assembly) of the lithium ion secondary battery 100 according to this embodiment is completed by housing the non-aqueous electrolyte in the case main body 42 together with the wound electrode body 80 and sealing the opening portion of the case main body 42 using the lid body 44. Note that a process for sealing the case main body 42 and a process for disposing (injecting) the electrolyte may be performed similarly to processes performed to manufacture a conventional lithium ion secondary battery.

As described above, the battery thus constructed uses an electrode (a negative electrode, for example) that includes an active material layer exhibiting superior quality stability and favorable adhesiveness. Therefore, the battery exhibits a superior battery performance. For example, when a battery is constructed using the electrode described above, a battery that satisfies at least one (preferably all) of high cycle durability, favorable productivity, a low manufacturing cost, and a favorable high rate charging/discharging performance can be provided.

This embodiment will be described in further detail below on the basis of examples.

To manufacture a negative electrode active material layer forming paste, carbon powder (a negative electrode active material), CMC powder (a thickener), and SBR (a binder) serving as raw materials were measured and prepared at a solid content compositional ratio of 98.7:0.7:0.7.

EXAMPLE 1

(Preparation of Thickener Aqueous Solution)

The thickener aqueous solution was prepared by introducing CMC powder and water into a commercially available powder absorbing and dissolving device (Damanizer, manufactured by Izumi Food Machinery Co. Ltd.) and dispersing and mixing the CMC powder through the water for thirty minutes at a circulation flow rate of 3000 L/h and a stirring speed of 100 rpm. The thickener aqueous solution was then passed through a folding filter to remove insoluble matter of 100 μm or more. A thickener concentration (a mass percentage concentration) of the thickener aqueous solution was regulated to 1.46%.

(Manufacture of Negative Electrode Active Material Layer Forming Paste)

The thickener aqueous solution and carbon powder were introduced into a commercially available stirrer/kneader (Hivis Disper Mix, manufactured by Primix Corp.) and stiff-kneaded for 0.5 hours at a rotation speed of 50 rpm (kneading process). Next, water was introduced into the stirrer/kneader and stirred for ten minutes at a rotation speed of 50 rpm, whereby the active material layer forming paste was manufactured from the resulting kneaded material (dilution process). An SBR solution was then introduced into the stirrer/kneader and stirred for ten minutes at a rotation speed of 50 rpm. As a result, a target negative electrode active material layer forming paste was obtained.

Note that in this example, the final solid content of the negative electrode active material layer forming paste was regulated to 54% by mass. Further, an amount of water X (=[amount of water introduced in the kneading process/total amount of water in the active material layer foaming paste]× 100) was regulated to 63.2%.

COMPARATIVE EXAMPLE 1

Figure 4:
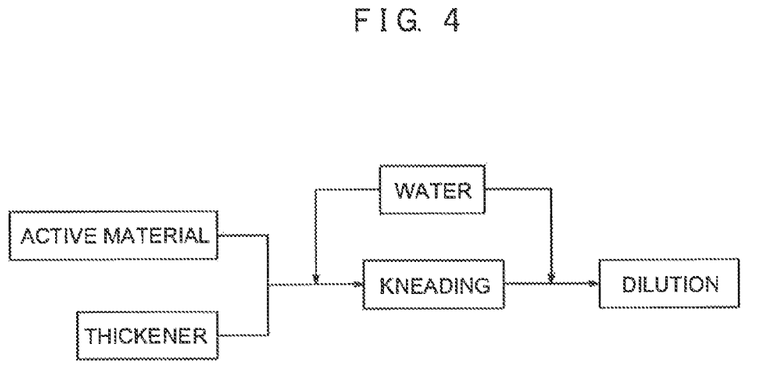
FIG. 4 is a view showing a manufacturing flow for an active material layer forming paste according to a comparative example 1.

In this example, the negative electrode active material layer forming paste was manufactured by introducing the thickener in powder form, i.e. in an undissolved state. More specifically, as shown in FIG. 4, carbon powder, CMC powder, and water were introduced into a commercially available stirrer/kneader (Hivis Disper Mix, manufactured by Primix Corp.) and kneaded for 0.5 hours at a rotation speed of 50 rpm (kneading process). Next, water was introduced into the stirrer/kneader and stirred for ten minutes at a rotation speed of 50 rpm (dilution process). An SBR solution was then introduced and stirred for ten minutes at a rotation speed of 50 rpm. As a result, a target negative electrode active material layer forming paste was obtained. Note that the solid content and the amount of water X in the negative electrode active material layer forming paste were similar to those of the example 1.

COMPARATIVE EXAMPLE 2

Figure 5:
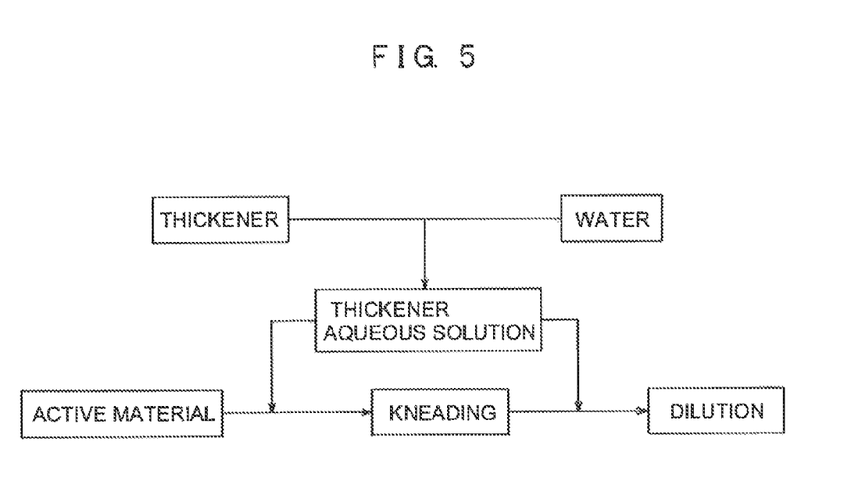
FIG. 5 is a view showing a manufacturing flow for an active material layer forming paste according to a comparative example 2.

In this example, the negative electrode active material layer forming paste was manufactured by stiff-kneading the thickener aqueous solution and the active material and then introducing the thickener aqueous solution. More specifically, as shown in FIG. 5, the thickener aqueous solution was prepared similarly to the example 1, whereupon a part of the thickener aqueous solution and carbon powder were introduced into a commercially available stirrer/kneader (Hivis Disper Mix, manufactured by Primix Corp.) and stiff-kneaded for 0.5 hours at a rotation speed of 50 rpm (kneading process). Next, the remainder of the thickener aqueous solution was introduced into the stirrer/kneader and stirred for ten minutes at a rotation speed of 50 rpm, whereby active material layer forming paste was manufactured from the resulting kneaded material (dilution process). An SBR solution was then introduced into the stirrer/kneader and stirred for ten minutes at a rotation speed of 50 rpm. As a result, a target negative electrode active material layer forming paste was obtained. Note that the solid content and the amount of water X in the negative electrode active material layer forming paste were similar to those of the example 1.

(Paste Viscosity)

The viscosities of the resulting negative electrode active material layer forming pastes relating to the example 1 and the comparative examples 1 and 2 were measured using an E type viscometer. Here, the viscosity was measured at a liquid temperature regulated to 25° C. and a rotor rotation speed of 1 rpm.

(Negative Electrode Sheet)

Further, negative electrode sheets were manufactured using the respective negative electrode active material layer forming pastes, and characteristics thereof were evaluated. The negative electrode sheets were manufactured as follows.

The respective negative electrode active material layer forming pastes were coated onto one surface of copper foil (a negative electrode current collector) in strip form and dried, whereby negative electrode sheets having a negative electrode active material layer on one surface of a negative electrode current collector were manufactured. A coating amount (on one surface) of the negative electrode active material layer forming paste was regulated to approximately 3.75 mg/cm$^2$ (on a solid content basis). Further, following drying, the negative electrode active material layer was pressed to a thickness of approximately 80 μm.

(Peel Strength)

Figure 6:
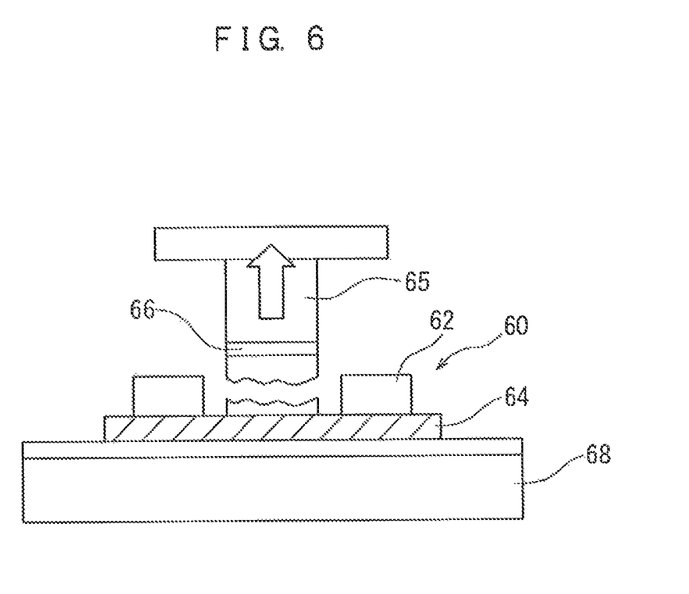
FIG. 6 is a pattern diagram showing a device for measuring peel strength.

Peel strengths of the respective negative electrode sheets were measured. More specifically, as shown in FIG. 6, the negative electrode sheet 60 was placed on a measuring table 68, a negative electrode active material layer 62 side surface was fixed to a jig 65 using double-sided tape (φ10) 66, and the jig 65 was pulled in a perpendicular direction (a peeling angle of 90±5°) to the surface of the negative electrode current collector 64 such that the negative electrode active material layer 62 was peeled away continuously at a speed of 0.5 mm per second. An average value of a load up to a point at which the negative electrode active material layer 62 was peeled away from the negative electrode current collector 64 was measured as the peel strength.

(Amount of Lack of Hiding (Pinholes))

The surfaces of the respective negative electrode active material layers were inspected using a commercially available surface defect inspection device (model name Iris, manufactured by Ayaha Engineering Co. Ltd), and an amount of lack of hiding (the number of pinholes) generated per 100 m of the negative electrode sheet was measured. Results are shown on Table 1.

TABLE 1

|  | Example 1 | Comparative Example 1 | Comparative Example 2 |
| --- | --- | --- | --- |
| Viscosity [mPa · s] | 2500 | 1000 | 20000 |
| Peel strength [kgf] | 1.5 | 1.5 | 1.2 |
| Amount of lack of hiding (pinholes) [number per 100 m of coating] | 4 | 115 | 5 |

As is evident from Table 1, in the comparative example 1, in which the thickener was introduced in powder form, i.e. in an undissolved state, the paste viscosity was low and the peel strength was high, but the number of pinholes in the active material layer was extremely large. In the comparative example 2, meanwhile, in which the thickener aqueous solution and the active material were stiff-kneaded and then the thickener aqueous solution was introduced, the number of pinholes in the active material layer was small, but the peel strength decreased slightly. Moreover, the paste viscosity was 20000 mPa·s, and therefore the ability to coat the current collector with the paste was poor. In the example 1, on the other hand, in which the thickener aqueous solution and the active material were stiff kneaded and then diluted in water, the paste viscosity was low at 2500 mPa·s, and therefore the ability to coat the current collector with the paste was favorable. Further, the peel strength was high at 1.5 kgf (1 kgf=9.80665 N), and therefore the ability to form an active material layer exhibiting favorable adhesiveness was confirmed. Moreover, the number of pinholes in the active material layer was small, and therefore the ability to suppress pinhole formation was confirmed.

EXAMPLE 2

A negative electrode active material layer forming paste was manufactured in a similar manner to the example 1 apart from modifying the thickener concentration of the thickener aqueous solution to 128% and modifying the amount of water X to 71.9%.

EXAMPLE 3

A negative electrode active material layer forming paste was manufactured in a similar manner to the example 1 apart from modifying the thickener concentration of the thickener aqueous solution to 1.18% and modifying the amount of water X to 78.2%.

The viscosities of the resulting negative electrode active material layer forming pastes and thickener aqueous solutions according to the examples 1 to 3 were measured using an E type viscometer. Here, the viscosities were measured at a liquid temperature regulated to 25° C. and a rotor rotation speed of 1 rpm. Results are shown on Table 2 and a graph in FIG. 7.

TABLE 2

|  | Example 1 | Example 2 | Example 3 |
| --- | --- | --- | --- |
| Amount of water [%] | 63.2 | 71.9 | 78.2 |
| Paste viscosity [mPa · s] | 2500 | 5875 | 13935.5 |
| Concentration of thickener aqueous solution [%] | 1.46 | 1.28 | 1.18 |
| Viscosity of thickener aqueous solution [mPa · s] | 15000 | 5000 | 2000 |

Figure 7:
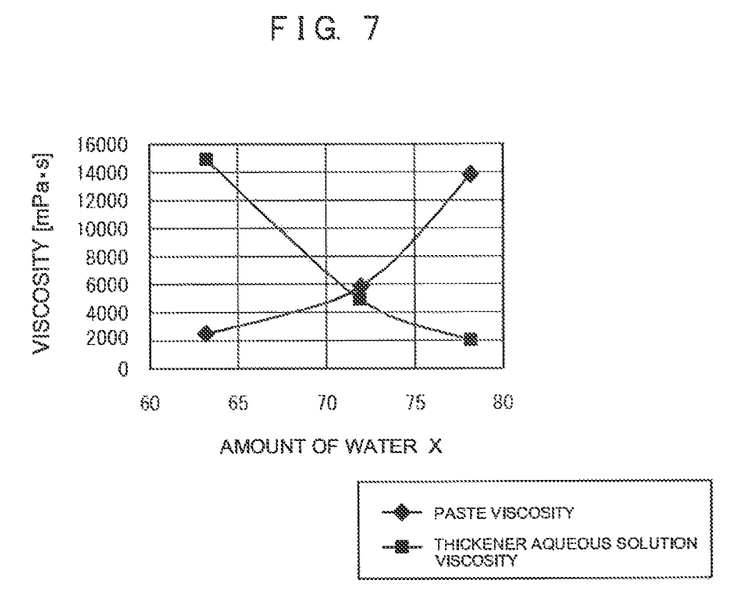
FIG. 7 is a graph showing a relationship between an amount of water and a viscosity.

As is evident from Table 2 and FIG. 7, in the example 3, in which the amount of water X was 78.2%, the paste viscosity was at least 10000 mPa·s, and therefore the ability to coat the current collector with the paste was worse than that of examples 1 and 2. In the example 1, meanwhile, in which the amount of water X was 63.2%, the paste viscosity was low, but the viscosity of the thickener aqueous solution was 15000 mPa·s, and therefore the ability to pass the thickener aqueous solution through the filter was worse than that of the examples 2 and 3. Hence, in consideration of both the coating ability of the paste and the filtering ability of the thickener aqueous solution, an appropriate amount of water X is approximately 67% to 76%, preferably 67.5% to 75.5, more preferably 68% to 74%, and particularly preferably 70% to 73%. In the cases of the negative electrode sheets tested here, it was possible to realize an active material layer forming paste exhibiting a favorable coating ability of no more than 10000 mPa·s by setting the amount of water X at no more than 76%. Further, by setting the amount of water X at no less than 67%, it was possible to realize a thickener aqueous solution exhibiting a favorable filtering ability of no more than 10000 mPa·s.

Preferred embodiments and examples of the present invention were described above, but the above description is not limiting matter and may of course be subjected to various modifications. For example, the description of the above embodiments and examples focused mainly on manufacture of a negative electrode for a lithium secondary battery, but the present invention is not limited thereto, and may be applied to both positive and negative electrodes. Moreover, the battery is not limited to the lithium secondary battery described above, and the present invention may be applied to various batteries having different electrode body structural materials and electrolytes, for example a nickel hydrogen battery or a nickel cadmium battery.

Industrial Applicability

The present invention provides a battery manufacturing method with which coating defects in an active material layer forming paste can be avoided such that a battery exhibiting superior quality stability and durability can be manufactured.

Figure 8:
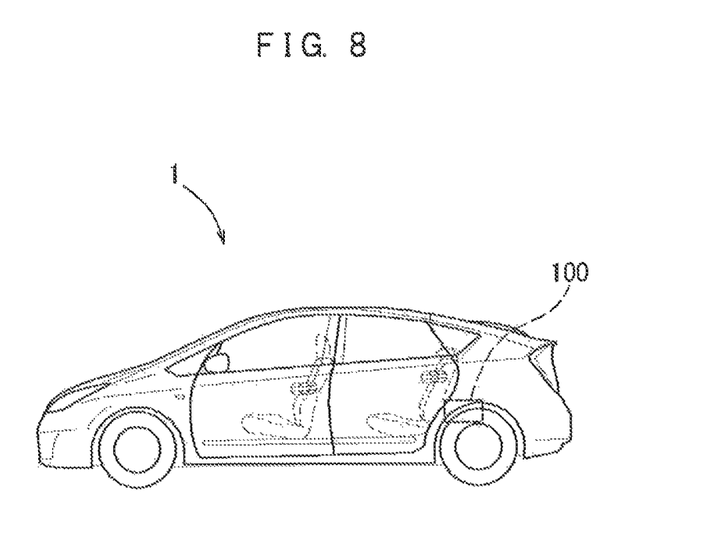
FIG. 8 is a side view showing in pattern form a vehicle installed with the battery according to the embodiment of the present invention.

Note that any of the batteries 100 disclosed herein exhibit a suitable performance as a battery installed in a vehicle. Hence, as shown in FIG. 8, the present invention provides a vehicle 1 including any of the batteries 100 disclosed herein. In particular, the present invention provides a vehicle (an automobile, for example) 1 including the battery 100 as a power supply (typically a power supply for a hybrid vehicle or an electric vehicle).

The invention claimed is:

1. A method for manufacturing a battery that includes an electrode having an active material layer which is formed by coating a current collector with an active material layer forming paste containing an active material, a thickener, and an aqueous solvent, and then drying the paste, the method comprising:

preparing a thickener aqueous solution by dissolving the thickener in the aqueous solvent;

a kneading step of introducing the active material into the prepared thickener aqueous solution and kneading a result;

a diluting step of adding an aqueous solvent that is free from the thickener to a kneaded material resulting from the kneading step such that the kneaded material is diluted, whereby the active material layer forming paste is obtained from the diluted kneaded material; and obtaining the electrode in which the active material layer is formed on the current collector by coating the current collector with the active material layer forming paste and then drying the paste, wherein the aqueous solvent is introduced in two stages that are the preparing step and the diluting step, and the aqueous solvent introduced in the preparing step occupies between 67% by mass and 76% by mass of a total amount of the aqueous solvent in the active material layer forming paste.

2. The battery manufacturing method according to claim 1, wherein the thickener aqueous solution is passed through a filter before performing the kneading step.

3. The battery manufacturing method according to claim 1, wherein a binder is introduced into the active material layer forming paste following the diluting step.

4. The battery manufacturing method according to claim 1, wherein a viscosity of the active material layer forming paste is between 1000 mPa·s and 10000 mPa·s.

5. The battery manufacturing method according to claim 1, wherein a solid content of the active material layer forming paste is between 50% by mass and 70% by mass.

6. The battery manufacturing method according to claim 1, wherein a viscosity of the thickener aqueous solution is between 1000 mPa·s and 10000 mPa·s.

7. The battery manufacturing method according to claim 1, wherein a cellulose-based polymer is used as the thickener.

8. The battery manufacturing method according to claim 1, wherein the electrode is a negative electrode of a lithium secondary battery, and a carbon-based material is used as the active material.

9. The battery manufacturing method according to claim 8, wherein foil-form copper or copper alloy is used as the current collector.

\* \* \* \* \*